United States Patent [19]

Saunders et al.

[11] Patent Number: 5,896,570
[45] Date of Patent: Apr. 20, 1999

[54] HANDOFF BY MONITORING OF RECEIVED SIGNAL STRENGTHS AMONG BASE STATIONS

[75] Inventors: Robert Stanley Saunders, Uxbridge; Nguyen Quan Tat, Yateley, both of United Kingdom

[73] Assignee: Nokia Mobile Phones, Ltd., Salo, Finland

[21] Appl. No.: 08/794,843

[22] Filed: Feb. 4, 1997

[30] Foreign Application Priority Data

Feb. 6, 1996 [GB] United Kingdom ................ 9602215

[51] Int. Cl.$^6$ .................................................. H04Q 7/20
[52] U.S. Cl. ................................... 455/437; 455/525
[58] Field of Search ................... 455/422, 432, 455/436, 437, 440, 443, 444, 524, 525, 446, 62, 450

[56] References Cited

U.S. PATENT DOCUMENTS

| | | | |
|---|---|---|---|
| 4,932,049 | 6/1990 | Lee | 455/446 |
| 5,128,959 | 7/1992 | Bruckert | 375/1 |
| 5,345,448 | 9/1994 | Keskitalo | 370/95.3 |
| 5,410,733 | 4/1995 | Niva et al. | 455/33.2 |
| 5,483,668 | 1/1996 | Malkamaki et al. | 455/33.2 |
| 5,524,009 | 6/1996 | Tuutijarvi et al. | 370/95.3 |
| 5,555,445 | 9/1996 | Booth | 455/436 |
| 5,673,307 | 9/1997 | Holland et al. | 455/437 |
| 5,754,956 | 5/1998 | Abreu et al. | 455/437 |

FOREIGN PATENT DOCUMENTS

0427687 A1  5/1991  European Pat. Off..

*Primary Examiner*—Nguyen Vo
*Attorney, Agent, or Firm*—Perman & Green, LLP

[57] ABSTRACT

A radio handset for communication via one of a plurality of channels with one of a plurality of base stations in a digital cellular telephone system, comprising means to monitor at first intervals signal activity in the channels and means to identify at second intervals from the signal activity in the channels a base station as a preferred candidate for intercell handoff.

5 Claims, 4 Drawing Sheets

Fig.2.
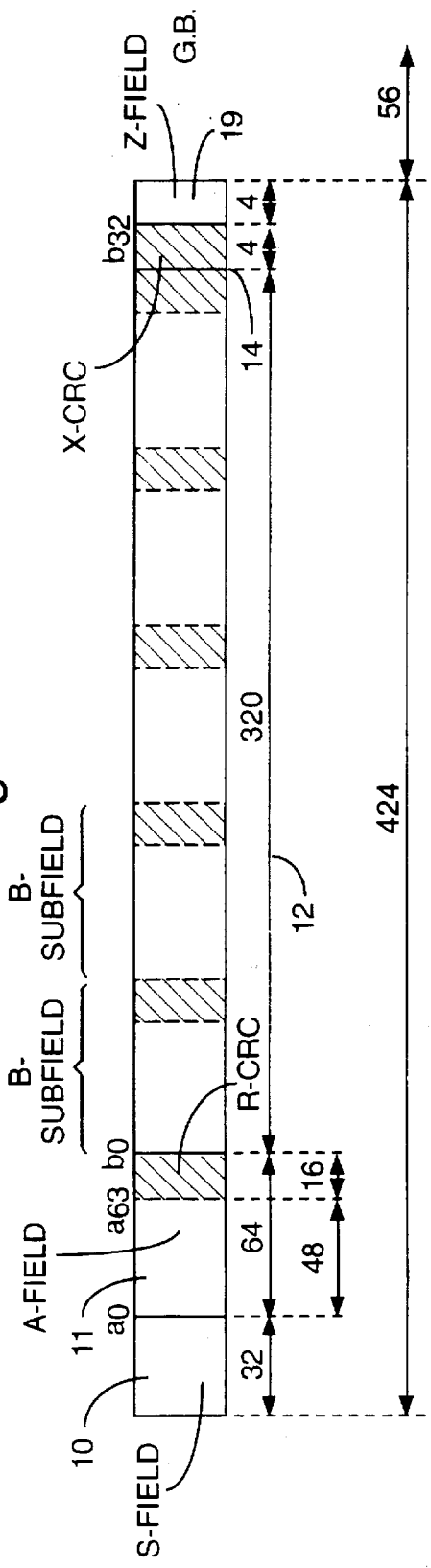
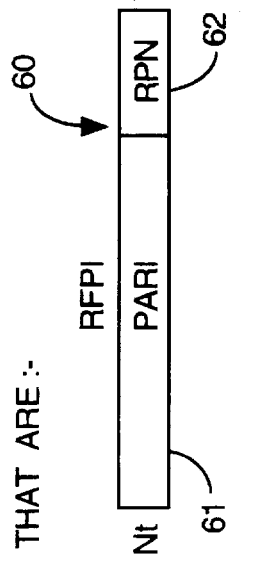
R-CRC: IS A 16 BIT CRC STORED IN BITS a48 - a63 CARRIED OUT ON THE 48 OTHER BITS IN THE A-FIELD a0 - a47
X-CRC: IS A 4 BIT CRC STORED IN BITS b320 - b323 CARRIED OUT ON THE LAST 16 BITS OF EACH B-SUBFIELD, THE 80 BITS THAT ARE:-
b48 — b63
b112 — b127
b176 — b191
b240 — b255
b304 — b325
Z-FIELD BITS: ARE A REPEAT OF THE X-CRC BITS

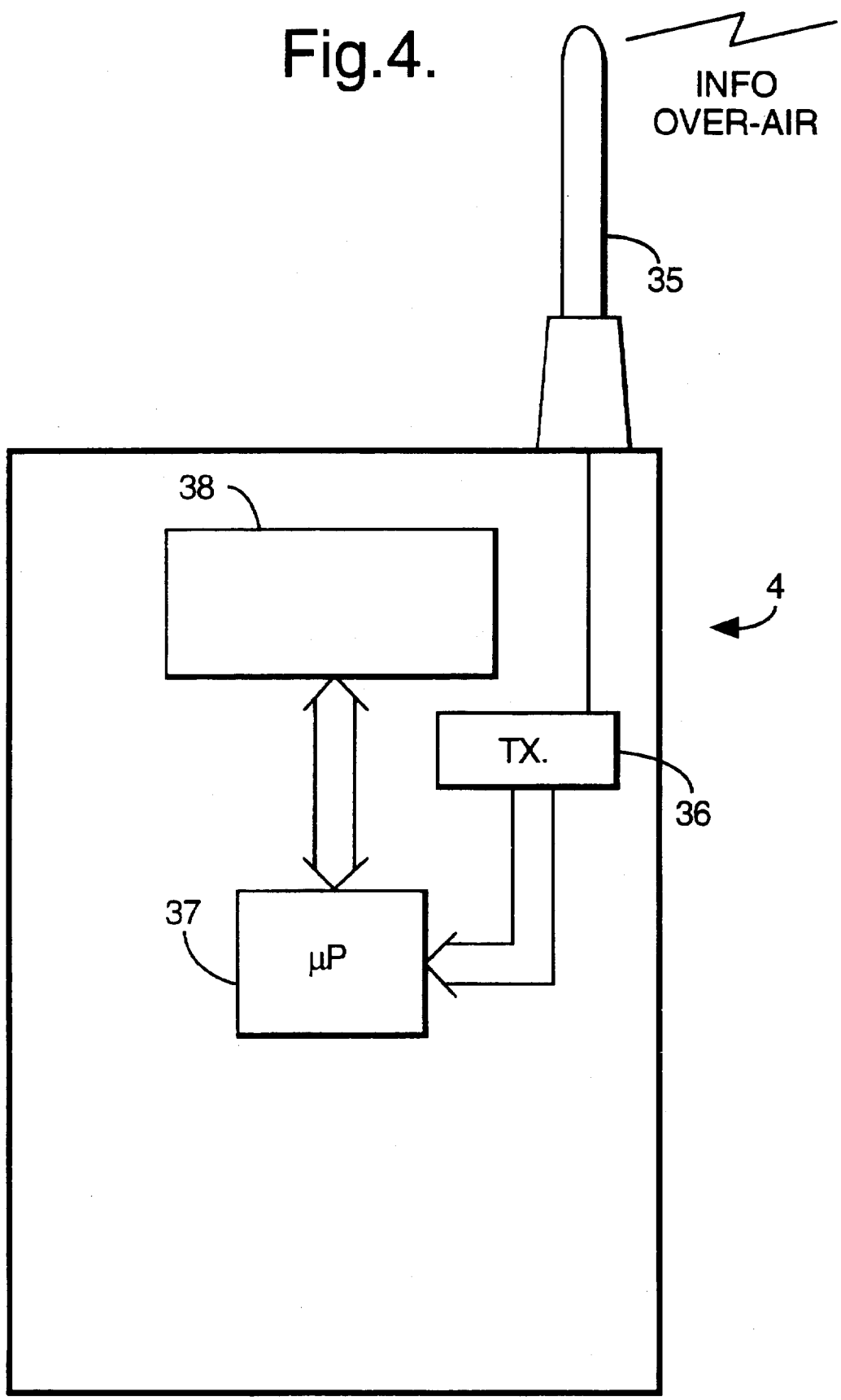

HANDOFF BY MONITORING OF RECEIVED SIGNAL STRENGTHS AMONG BASE STATIONS

BRIEF FIELD OF INVENTION

The present invention is concerned with handoff in a digital cellular radio telephone system. The present invention has particular, but not exclusive, application to those systems which conform to the DECT (Digital European Cordless Telecommunications) standard.

BACKGROUND OF THE INVENTION

FIG. 1 shows a schematic view of cells in a DECT system.

The portion of the radio system depicted comprises two fixed base stations 1 and 2 serving respective cells 3 and 4 representing areas of radio coverage which may be inside or outside buildings. The edges of further cells 7 and 8 are also shown. A user or subscriber to the system carries a portable handset 5 which is capable of two-way radio communication with one or other of the base states 1,2, and with other base stations. The system uses ten carrier frequencies, separated by 1.728 MHz, within a frequency band from 1880 MHz to 1900 MHz. This system divides time into TDMA frames, with each frame having a time duration of 10 ms. Each frame is divided into 24 time slots, numbered from 0 to 23. Each frame is divided into two halves, the first half (slots 0 to 11) being reserved for the transmission of the base station and the second half (slots 12 to 23) being reserved for the transmission of the handset. The handset carries the algorithm or algorithms for channel selection (i.e. selection of the combination of a particular time slot and carrier) in its processor.

Most currently manufactured DECT base stations contain a single transceiver and are therefore unable to open more than a single communication channel, a combination of time slot and frequency, on different frequency carriers in the same time slot. A time slot already having a traffic channel is 'blind'. This means that although the number of channels available for selection is the number of carriers multiplied by the number of time slots, the maximum number of concurrent users is restricted to the number of available time slots i.e. twelve. The DECT standard includes a blind slot information message sent by a base station to inform the handset of time slots it should avoid for selecting a channel. In addition to slots 'blinded' by the base station, a handset 'blinds' channels itself as its frequency synthesiser is typically unable to switch to a channel at the next time slot but at a different frequency to that to which it is currently locked, i.e. the current channel.

The handset 5 monitors signals transmitted by a current base station 1 to receive system information via a current channel. A signal packet is transmitted each frame on active and dummy channels. Each signal packet is divided into four fields only one of which transmits system information. The signal packet structure is illustrated in FIG. 2. The S-field 10 used for synchronisation, and the A-field 11 used to send signalling information in accordance with the DECT protocol are both used when locking on. The B-field 1 2 is used for sending speech or data to a system user and the Z-field 13 is provided specifically for sliding error detection. In addition to the Z-field, the A and B fields have their own error detection sub-fields known as Cyclic Redundancy Checks 14 (CRCs). The A-field is 64 bits long with the final 16 bits providing an error check on the preceding 48 bits.

Information on the RSSI (Received Signal Strength Indicator) is measured, periodically, for the channels of the system, for example at a rate of once per two seconds. This is stored in the handset as a list. An example of such a list is shown in FIG. 3. Referring to FIG. 3, the twelve slots 1–11 (from the base stations) are shown as columns, with the ten carrier frequencies being represented by horizontal rows. Hence, the array of FIG. 3 has 120 boxes, each representing a particular channel, i.e. a particular combination of time slot and frequency. Signal strength is allocated a level from 0 to 14 (typically 6 dB bands are used), with 0 being the most quiet and 14 being the least quiet.

When a call is in progress, the handset 5 continuously measures the transmission error rate on the current channel using the CRC fields 14, and also continuously measures the RSSI information for the current channel. If the quality of the current channel deteriorates below an acceptable level as can be determined by the transmission error rate and/or the RSSI information for the current channel, the handset 5 can select an alternative channel and then attempt handoff to this channel. The handoff can either be to a different channel at the same base station (intracell) or to a different channel at a different base station (intercell). Once the quality of the current channel deteriorates below an acceptable level, the handset 5 has a finite number of attempts, currently 10 under the DECT standard, to handoff successfully before the system considers the call to be lost.

The reason for placing a limit on the number of attempts allowable to achieve successful handoff is to prevent handsets from contributing unnecessarily to the noise levels in the system by repeatedly and unsuccessfully trying to handoff to a particular channel. Anyway, after the time taken to make 10 handoff attempts has elapsed, the handset is losing synchronising with the system to such an extent that it is unlikely to be able to decode any system information signals.

SUMMARY OF THE INVENTION

The present invention aims to provide a strategy for increasing the likelihood that handoff will be successful even in harsh environmental conditions.

To this end, the present invention provides a radio handset for communication via one of a plurality of channels with one of a plurality of base stations in a digital cellular telephone system, comprising means to monitor at first intervals signal activity in the channels and means to identify at second intervals from the signal activity in the channels a base station as a preferred candidate for intercell handoff.

Thus, when say 5 intracell handoffs have been attempted unsuccessfully, 5 intercell handoffs with the already-identified preferred candidate can be attempted, thus hopefully increasing the likelihood that the call will not be lost.

BRIEF DESCRIPTION OF THE DRAWINGS

A handset in accordance with an embodiment of the invention comprises all the features of the handset so far described and additionally comprises the features described hereinafter reference to the accompanying drawings, in which:

FIG. 2 shows a signal packet under the DECT protocol;

FIG. 4 shows a schematic view of a DECT handset.

DETAILED DESCRIPTION OF THE EMBODIMENTS OF THE INVENTION

Figure 1:
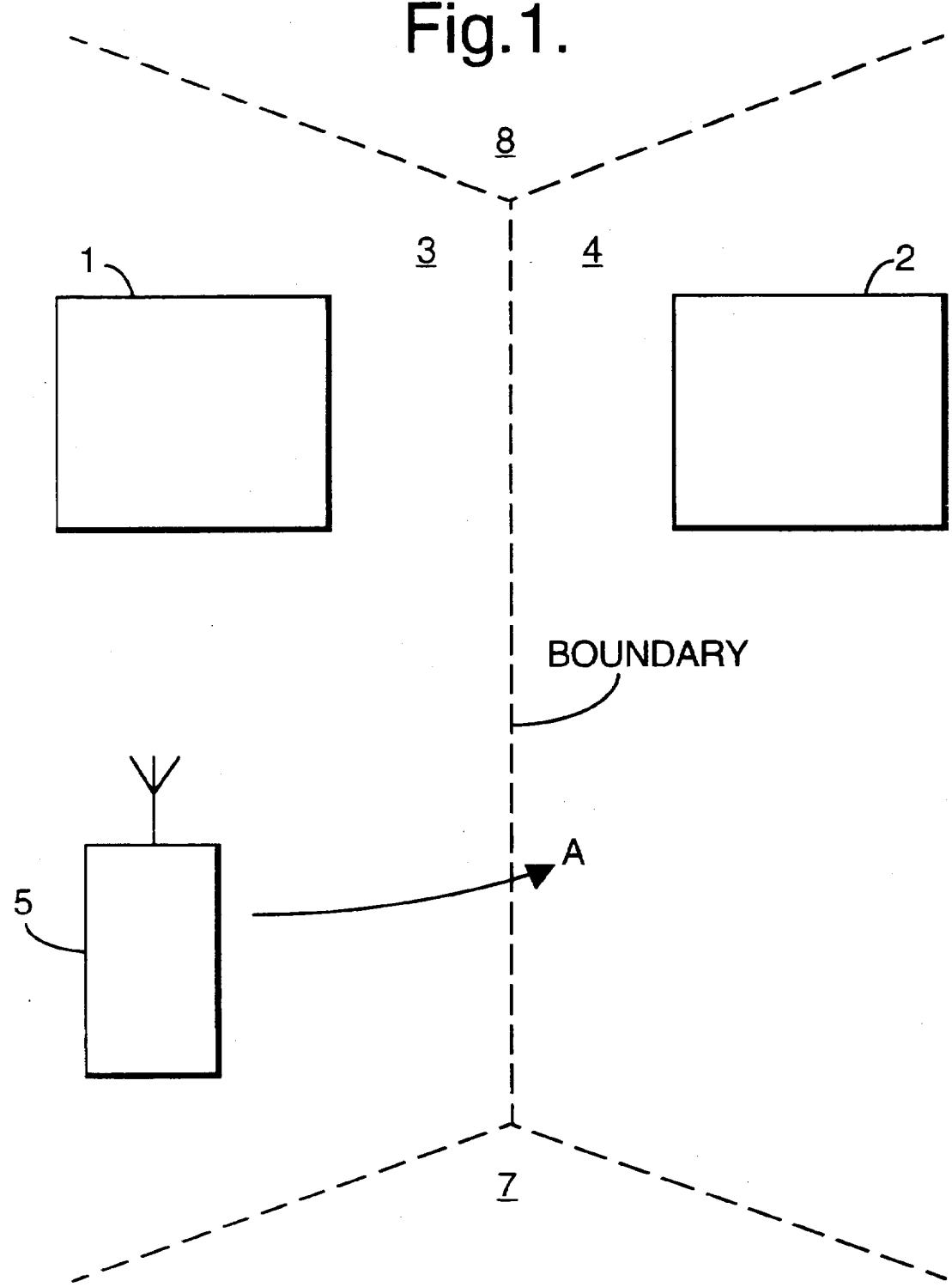
FIG. 1 shows a schematic view of cells in a DECT system.
Figure 3:
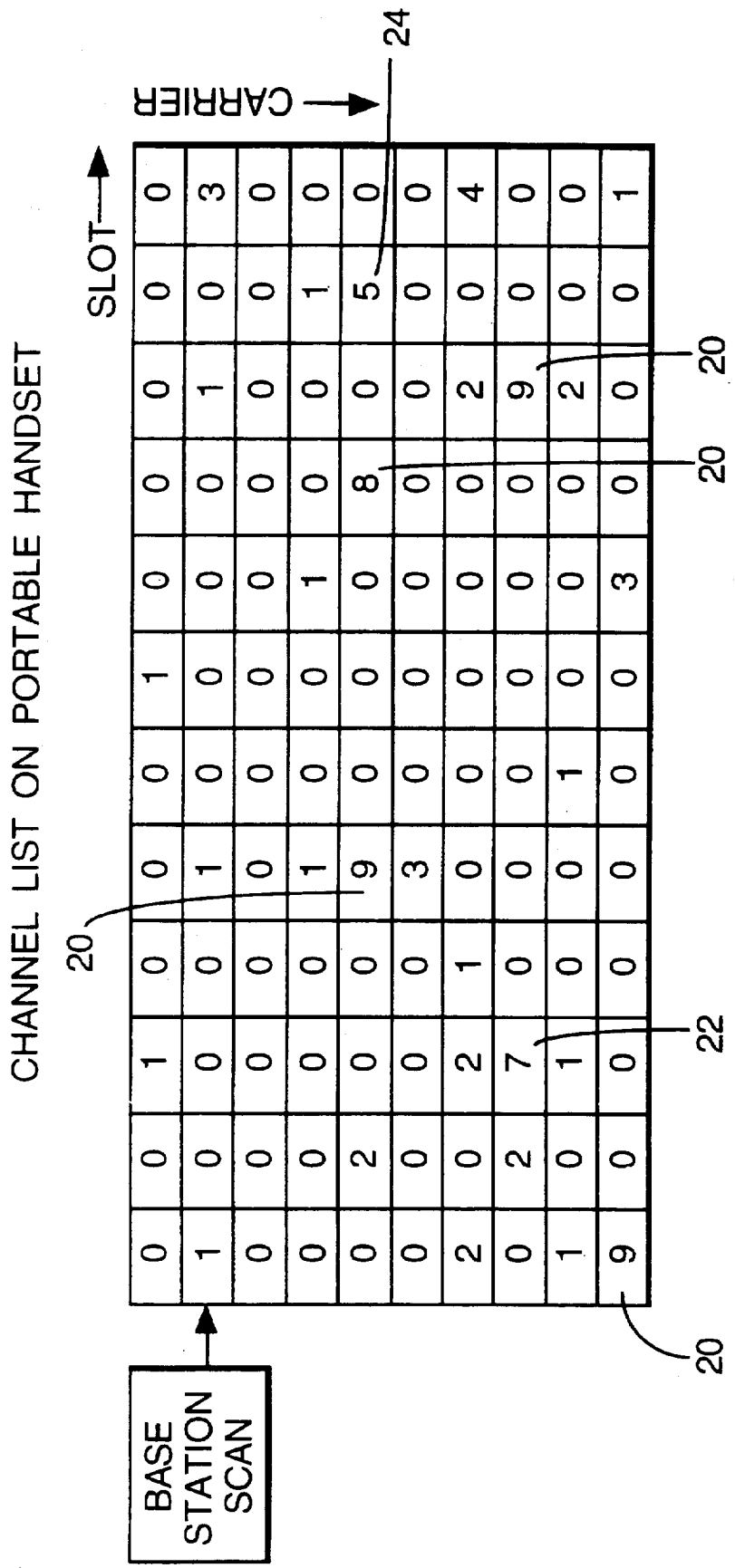
FIG. 3 shows a channel list stored in DECT handset.

The handset 5 comprises means to monitor at first intervals signal activity in the channels. This signal activity is quantified by scanning the channel in turn and establishing an RSSI figure indicative of the signal levels in the channel and then compiling those figures as a list as described in relation to FIG. 3. This function is performed preferably every two seconds.

The handset 5 further comprises means to identify at second intervals from the signal levels in the channels a base state as a preferred candidate for intercell handoff. Once an RSSI list has been compiled, the list is used to enable a systematic check of the channels in order of the channel with the highest RSSI figure downwards with the aim of identifying the base state which is responsible for the highest RSSI figure but which is not the current base station. The check of each channel involves decoding the identity information transmitted on each channel. As an example, referring to FIG. 3, the highest RSSI FIGS. 20 might originate from the current base state, the next highest RSSI FIGS. 22 might be noise in that the channels do not include any decodable identity information and the RSSI FIG. 24 might originate from another base station. This base station is then considered to be the preferred candidate for handoff.

Because identifying the preferred candidate for handoff can require recovering the identity information from a considerable number of channels, 6 in the example given, it is preferred that this function is performed not after every RSSI scan but after one of a number of RSSI scans. Thus, an individual one of the foregoing second intervals may be an integral multiple of an individual one of the foregoing first intervals. A suitable number of scans might be approximately 10 scans.

Referring to FIG. 4, the handset 5 has an antenna 35, a transceiver 36 and a processor 37 programmed with an algorithm which is operative to select a communication channel with a base station. Information is displayed on a Liquid Crystal Display (LCD) 38. The processor 37 is also programmed to perform the function of the monitoring means and the identification means.

What is claimed:

1. A radio handset for communication via one of a plurality of channels with one of a plurality of base stations in a digital cellular telephone system, the radio handset comprising:
   first means for designating a first set of said channels as channels of a present base station currently in communication with the handset;
   second means for designating a second set of said channels as channels of base stations exclusive of said present base station;
   means to monitor at first intervals signal activity in the channels of both the first set and the second set; and
   identification means to identify an acceptable channel of the first set of channels having sufficient signal strength for an intracell handoff and, in the absence of an acceptable channel in the first set of channels, the identification means is operative to identify at second intervals from the signal activity in the channels of the second set of channels a base station as a preferred candidate for intercell handoff.

2. A handset as in claim 1, wherein the monitoring means measures the RSSI information for the channels.

3. A handset as in claim 1, wherein the identification means attempts to decode the identity information from each channel in order of signal activity until identity information of a base station other than the current base station is recovered.

4. A handset as in claim 1, wherein the second interval is an integral multiple of the first interval.

5. A handset as in claim 1, further including means, on the quality of the current channel deteriorating below an acceptable level, operable to make a number of intracell handoff attempts, and if handoff is unsuccessful, to make further intercell handoff attempts with said preferred candidate.

* * * * *